United States Patent

[11] 3,576,532

[72] Inventor Gerhard Kaps
 Hamburg, Germany
[21] Appl. No. 646,335
[22] Filed June 15, 1967
[45] Patented Apr. 27, 1971
[73] Assignee U.S. Philips Corporation
 New York, N.Y.
[32] Priority June 21, 1966
[33] Germany
[31] P39755

[54] FREQUENCY COMPARATOR USING DIGITAL CIRCUITS
 4 Claims, 9 Drawing Figs.
[52] U.S. Cl. .................................................. 340/146.2,
 235/177, 324/79, 328/134, 307/233
[51] Int. Cl. .................................................. G01r 23/10,
 H03d 13/00
[50] Field of Search .................................................. 235/150.3;
 307/233; 328/133, 134, 141; 324/70; 340/146.2;
 235/177, 175; 324/79

[56] References Cited
UNITED STATES PATENTS
2,672,284 3/1954 Dickinson .................. 235/175

| | | | |
|---|---|---|---|
| 2,944,219 | 7/1960 | Tanaka et al. ................ | 328/134 |
| 2,951,202 | 8/1960 | Gordon ....................... | 324/79 |
| 3,093,796 | 6/1963 | Westerfield .................. | 324/79UX |
| 3,391,343 | 7/1968 | McCurdy ..................... | 328/133 |
| 3,404,260 | 10/1968 | Johnson ...................... | 324/79X |

OTHER REFERENCES
Yeager, A. P.: Analog-to-Digital Frequency Measuring System in IBM Technical Disclosure Bulletin. 8 (10), p. 1361-—1366. March 1966. 235/150.3.

*Primary Examiner*—Eugene G. Botz
*Assistant Examiner*—R. Stephen Dildine, Jr.
*Attorney*—Frank R. Trifari

ABSTRACT: A ratio circuit for providing fine ratio control between a measured value and a desired value at a predetermined instant is provided with a comparison counter accumulating a measured value, and a plurality of selection devices each preset to a fractional proportion of the desired value. The presetting devices are driven by a common pulse source, all but the first presetting device coupled to the source via a frequency divider.

| e \ m | 1 | 2 | 3 | 4 | 5 | 6 | 7 | 8 | 9 | 10 |
|---|---|---|---|---|---|---|---|---|---|---|
| 0 | | | | | | | | | | |
| 1 | | | | | | | | | | X |
| 2 | | | | | X | | | | | X |
| 3 | | | | X | | | X | | | X |
| 4 | | | X | | X | | | X | | X |
| 5 | | X | | X | | X | | X | | X |
| 6 | | X | | X | X | | X | | X | X |
| 7 | | X | X | | X | X | | X | X | X |
| 8 | | X | X | X | X | | X | X | X | X |
| 9 | | X | X | X | X | X | X | X | X | X |

FIG.4

FREQUENCY COMPARATOR USING DIGITAL CIRCUITS

The invention relates to a control device operating on frequency- or time-proportional signals, particularly for high-speed ratio controls. The measured magnitudes are represented by frequencies and the desired values of the components of the ratios are supplied or stored with a fine numerical division. The quantitative difference between measured and desired values, as expressed as time intervals or numbers of pulses proportional to the control deviation or the departure or integral thereof, are obtained at predetermined instants by comparing a counter position determined by a measuring frequency from a pickup with a predetermined counter position corresponding to the desired value. The invention relates, more particularly, to control devices in which the control deviation or the integral thereof is formed by summation of the measuring frequency, provided by a pickup, in a preset counter. At instants determined by an external time base having an interval $T_0$, it is then determined whether the counter state reached by counting the measuring frequency is higher or lower than or equal to a value of the counter state corresponding with the desired value (setpoint). With higher frequency $f_0$, which, dependent upon the counter state, is then subtracted from or added to the measuring frequency or is suppressed, counting is then continued until the desired value is attained. The counter is then reset to zero and a new cycle begins. The difference between the pulse numbers of the attained state and the preset state or the time between the starting instant determined by the time base and the instant of attaining the desired state of the counter may be proportional to the integral of the control deviation or to the control deviation itself.

Such devices as described above are known, however, they have the disadvantage that the desired accuracy of the adjustment of the desired value (setpoint) with low measuring frequencies, for example, in the case of turbine flow meters, requires a long scanning time T. Since in these known control devices the mean value of the measuring magnitudes during the scanning time $T_o$ is picked up, the instantaneous deviations from the control magnitude produced by disturbances which are short with respect to the scanning time in high-speed control circuits are not compensated, since they do not affect the mean value. Therefore, the use of these control devices is restricted to control circuits of fairly low speed, if no additional, for example, analogue control members are employed.

The object of the invention is to provide control devices in which the scanning time T is shorter than the scanning time $T_o$, as determined by the accuracy of adjustment of the desired value and by the measuring frequency. Thus, particularly with the use of multichannel devices, the possibilities of counting are obtained in a simpler way. In the arrangements according to the invention a more rapid control is obtained in the event of short duration disturbances.

According to the invention these advantages are obtained by providing, for processing the measured and the desired magnitudes in each control circuit, a comparison counter having a fraction of the counting capacity determined by the accuracy of the stored or desired value. Means for assessing the polarity of time intervals or number of pulses proportional to the control deviation and a frequency divider is arranged in common to all control circuits and further means provided for controlling the comparison counters by means of said frequency divider in accordance with the stored or supplied desired values at predetermined scanning instants.

Further features of the invention will be evident from the following description with reference to the accompanying drawing.

FIG. 4 shows the calculated pulse selection depending upon the desired value.

FIG. 1 shows the basic diagram of a control device according to the invention for a single control circuit, comprising a time-base generator $G_T$, a frequency divider $Z_T$ with a presetting member $SE_T$, and a comparison counter $Z_M$ with a presetting member $SE_M$.

Figure 1:
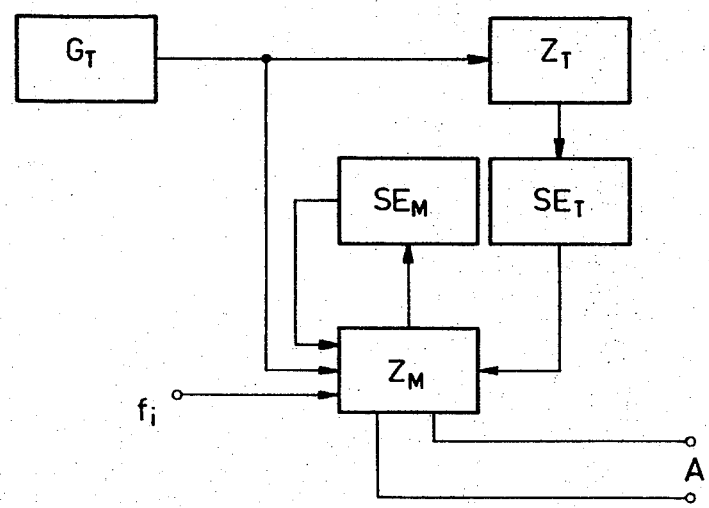
FIG. 1 shows the basic diagram of a device according to the invention for a control circuit.

The measuring frequency $f_i$ (measured value) is applied continuously to the comparison counter $Z_M$. At the scanning instants determined by the time-base generator $G_T$ and having an interval T it is determined by the comparison counter $Z_M$ whether the counted number of pulses is higher, lower than or equal to the desired number adjusted in the presetting member $SE_M$, there being derived, for example, an output signal proportional to the departure and having a given polarity.

With a given measuring frequency range and a given scanning time T (duration of the period of the time-base frequency) the stepwise presetting of the desired value is fixed by the presetting member $SE_M$. Since only integral numbers can be used as presetting values, the stepwise division is less fine with a shorter scanning time at a fixed measuring frequency or a lower measuring frequency with a fixed scanning time. The frequency divider $Z_T$ with the presetting member $SE_T$ serves to obtain a finer stepwise division of the desired value with a given measuring frequency and given time base via the presetting members $SE_M$ and $SE_T$ or to admit a higher time-base frequency with a predetermined stepwise division of the adjustment of the desired value, which means that the process to be controlled can be modified more frequently. For this purpose the time-base pulses are fed continuously in the frequency divider $Z_T$ and via the presetting member $SE_T$, in accordance with the supplied numbers, at predetermined time intervals, the numerical value stored in the presetting member $SE_M$ is raised apparently by 1. The capacity of the counter $Z_M$ without the part required for passing the maximum desired value and that of the frequency divider $Z_T$ have to be chosen so that their product is equal to the required reciprocal stepwise division of the adjustment of the desired value. The division of the required overall counting capacity is made in accordance with the desired scanning frequency.

By way of illustration the following numerical example is given for explaining the idea of the invention.

A measuring pickup supplies in one scanning period:
$T_o$=1 sec $100h+10z+e$876 pulses.

With a control departure 0 the associated desired value stored is therefore: $100h+10z+e$876. Supposing that 1000 pulses per $T_o$ correspond to the value 1, the desired value is divided into steps of 1 percent. The required overall counting capacity of the device shown in FIG. 1 amounts in this case to 1000. Within a scanning time $T_1$ of, for example, $T_o/100$ $$\frac{(100h+10z+e)\cdot T_1}{T_0} = 8.76 \text{ measuring pulses}$$

may be expected.

However, since counting can be carried out only in steps of integral numbers, there are obtained during $10z+e$=76 time intervals, of the time $T_1$,: $(h+1)$=9 measuring pulses, and, during $100-10z-e$=24 time intervals of the time $T_1:h$=8 measuring pulses. If in a control device the presetting of the desired value has to be in steps of 1 percent, so that the desired value $100h+10z+e$=876 with respect to the scanning time $T_o$ has to be adjusted, whilst the scanning time $T_1=T_o/100$, it is necessary to adjust, in the time intervals of the duration $T_1$, a fraction of the desired value in accordance with the actual value to be expected with a control departure 0 in the intervals of the duration $T_1$. Therefore it is necessary to adjust within $10z+e$=76 of 100 intervals of the duration $T_1$, the fraction of the desired value $h+1=9$ and within the remaining $100-10z-e=$ intervals, the fraction of the desired value $h=8$.

It can be easily indicated in which of the $T_0/T=100$ time intervals of the duration $T_1$ $(h+1)=9$ measuring pulses can be expected. If the current number of the intervals is designated by $m$, $h+1=9$ pulses appear in the intervals:

$$m = \frac{n100}{10z+e} = \frac{n}{0.76} \text{ where } n = 1, 2 \ldots 10z+e$$

Since $m$ can be only an integral number, the calculated values have to be reduced to integral numbers. It is thus determined in which of the 100 intervals of the duration $T_1$ the fraction of the desired value $h$ has to be raised to $h+1$.

In the embodiment chosen according to the invention the counting capacity of the frequency divider $Z_T$ is 100 and that of the comparison counter $Z_M$ is 20, if a transgression of 100 percent of the maximum desired value by the measuring frequency has to be allowed. In the presetting member $SE_M$ and in $SE_T$ the value $h=8$ and the value $10z+e76$ are adjusted or supplied thereto. In the $10z+e$ time intervals, in which $h+1$ measuring pulses may be expected, the fraction of the desired value stored in $SE_M$ ($h$) is apparently raised by 1 under the control of the frequency divider $Z_T$ via the presetting member $SE_T$ because the comparison counter $Z_M$, after having reached the predetermined state $h$, is adjusted, at the beginning of the time intervals concerned, to its final value instead of being adjusted to the counter state O.

Figure 2:
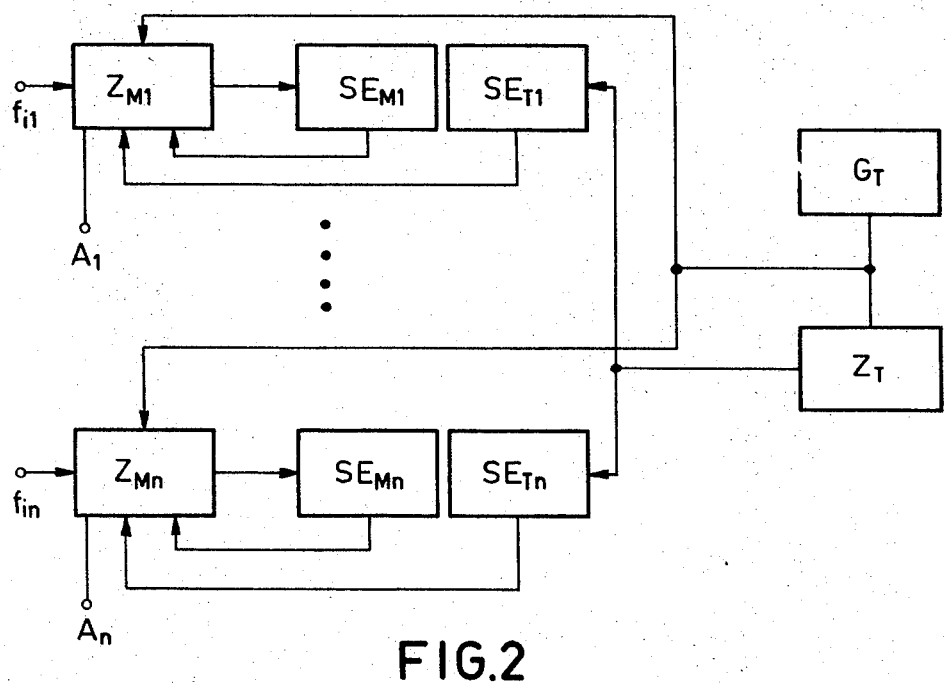
FIG. 2 shows the same device as FIG. 1 but for a number $n$ of control circuits.

FIG. 2 illustrates the basic diagram of the control device of FIG. 1, extended to a plurality of control circuits. Each control circuit requires only the comparison counter $Z_{Mi}$ and the members for storing the desired value $SE_{Mi}$ and $SE_{Ti}$. The time base $G_T$ and the frequency divider $Z_T$ is common to all control circuits and are required only once for any number of control circuits. The separate control circuits operate in the same manner as that of FIG. 1.

The following example applies to the synchronous technique. The trigger and counting circuits are controlled by means of switching pulses of the frequency $f_p$, derived from a central clock-pulse generator and applied continuously to all stages at the inputs $q$, after the stages have been preset via the signal inputs.

Figure 3:
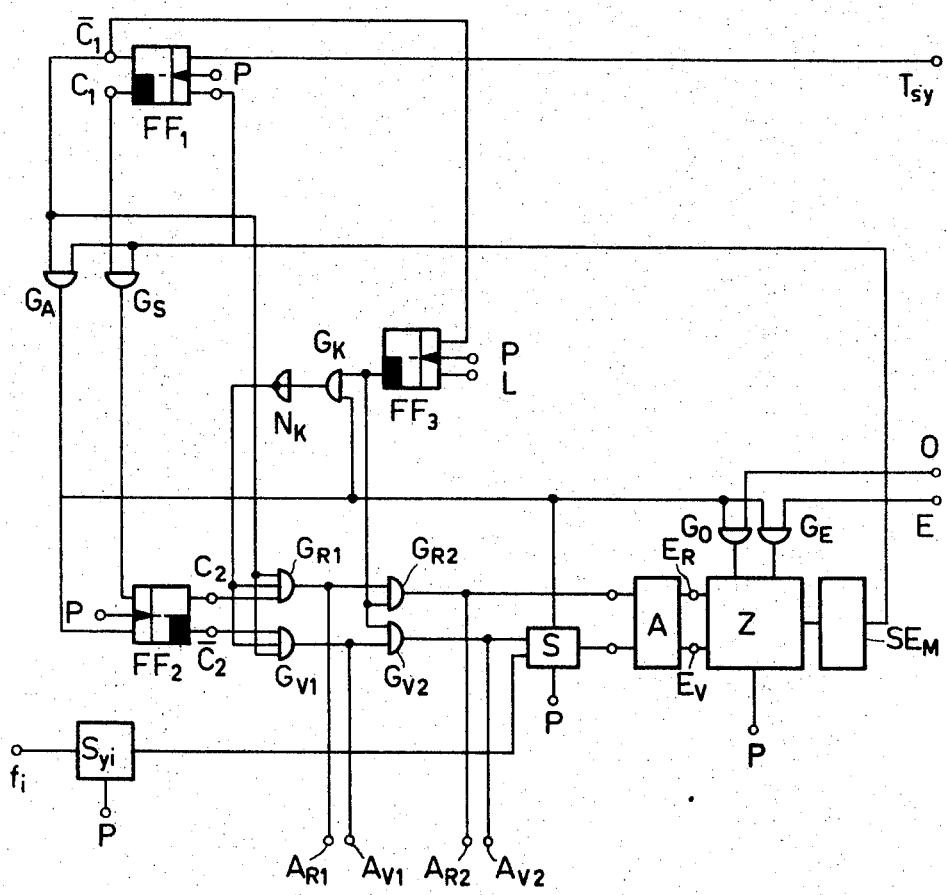
FIG. 3 shows the logical diagram of an embodiment of the comparison counter.
Figure 3A:
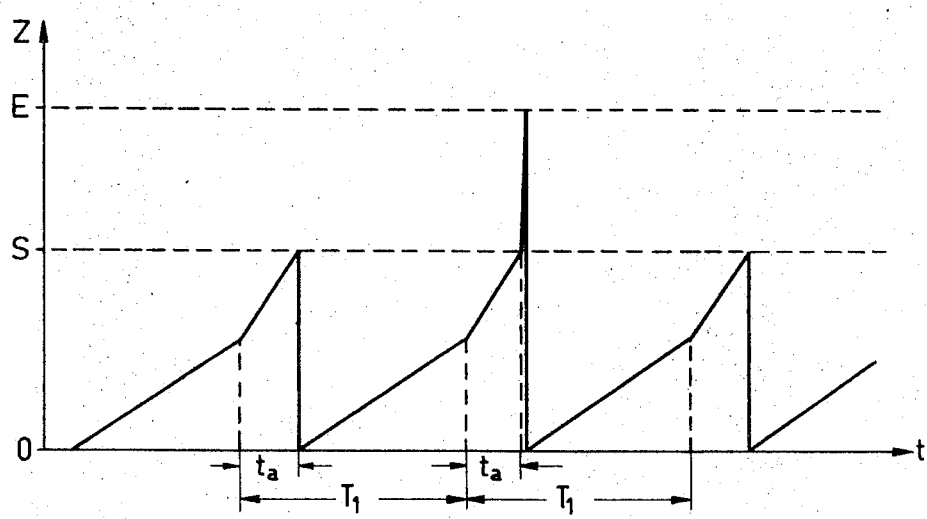
FIG. 3a shows the principle of the course of the positions of the comparison counter according to time in the switched-on state with too small an actual value.
Figure 3B:
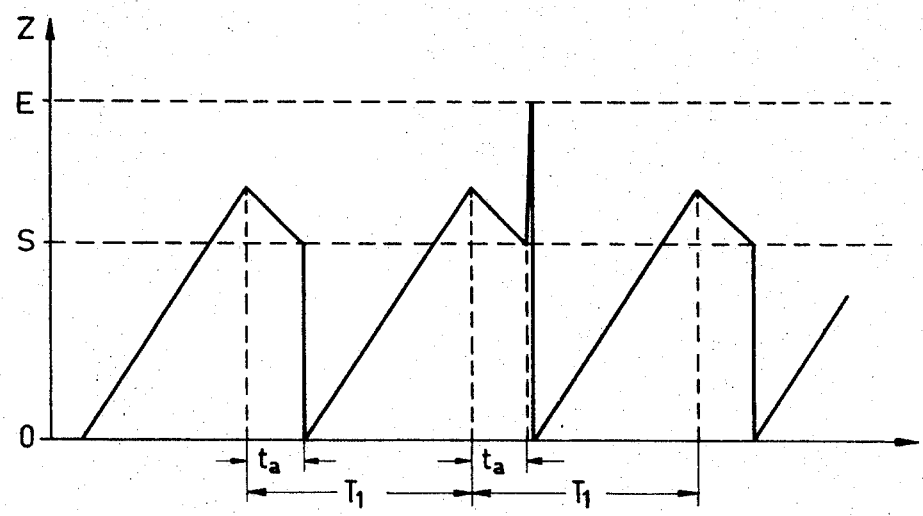
FIG 3b shows the same as FIG. 3a for too high an actual value.

FIG. 3 illustrates the logical diagram of a possible embodiment of the comparison counter formed by two-way counter Z, before which an anticoincidence stage A is connected, a summation stage S, a presetting member $SE_M$ for the coarse adjustment of the desired value, a synchronizing stage $S_{yi}$ for the measuring frequency $f_i$, bistable triggers $FF_1$ and $FF_1$, an inverting stage $N_k$, AND gates $G_A$, $G_S$, $G_{V1}$, $G_{V2}$, $G_{R1}$, $G_{R2}$, $G_K$, $G_0$ and $G_E$ and bistable triggers $FF_3$, which supplies, under the control of $FF_1$, a square-wave signal of half the clock-pulse frequency $f_{p/2}$. The pulses of measuring frequency $f_i$ (actual value) supplied from a pickup (not shown) are synchronized in the synchronizing stage $S_{yi}$ with the clock-pulse frequency $f_p$ and then applied continuously via the summation stage and the anticoincidence stage, to the adding input of the difference counter Z. The operation of the device shown in FIG. 3 will now be described. The operation is illustrated in the waveforms of FIGS. 3a and 3b wherein E is the final value in the Z counter, and S is the preselected value in the Z counter. It is first assumed that the actual value $f_i$ is lower than the desired value $f_s$. The bistable triggers are in the starting positions shown. At the arrival of a synchronized time-base pulse ($T_{SY}$), the difference counter Z has not yet reached the desired value stored in the presetting member $SE_M$. The change over of the bistable trigger $FF_1$ by means of the clock-pulse coinciding with the time-base pulse presets the AND gate $G_A$ and produces the change over of the stage $FF_3$ with the clock-pulse frequency $f_p$, so that at the output $A_{V1}$ of the AND gate $G_{V1}$ a potential L appears whilst via the AND gate $G_{V2}$ the pulses of the follower frequency $f_{p/2}$ supplied by the stage $FF_3$ appear at the input of the summation state. In the difference counter Z is then added the sum formed by the measuring frequency $f_i$ and half the clock-pulse frequency $f_{p/2}$. When the desired value is reached, the output of the presetting member $SE_M$ is at L potential. Thus the stage $FF_1$ is changed back and the counter Z is set to zero or to the final value via the AND gates $G_A$ and $G_0$ or $G_E$. The gates $G_0$ and $G_E$ are controlled via the inputs 0 and E via the presetting member $SE_T$ (FIG. 1), provided for the fine adjustment of the desired value. The AND gate $G_K$ and the inverting stage $N_K$ prevent output pulses of the trigger $FF_3$, coinciding with the output signal of the AND gate $G_A$, from penetrating to the counter Z. The output pulses of the summation stage, coinciding with the setting signal for the counter, are, however, stored provisionally for the duration of the setting signal in the summation stage in order to prevent loss of a measuring pulse and then applied to the adding input $E_V$ of the counter Z. For this purpose also the summation stage receives the output signal of the gate $G_A$. After the adjustment of the counter counting is continued again only with the measuring frequency until at the next following time-base pulse at a distance $T_1$ from the preceding time-base pulse the cycle described starts again. The output magnitudes, proportional to the control departure, are available, if $f_i < f_s$, in the form of time intervals $t_A$ at the output $A_{V1}$ of the gate $G_{V1}$ and in the form of pulse numbers at the output $A_{V2}$ of the gate $G_{V2}$. The position of the comparison counter exhibits, in the stationary state, the basic time variation illustrated in FIG. 3a in the case of a constant difference between the desired value and the actual value of the measuring frequency $f_i$.

It is now supposed that the actual value $f_i$ exceeds the desired value $f_s$. The bistable triggers are again in the starting positions shown. By counting the measuring frequency in the counter Z the desired value of the counter position stored in the presetting member $SE_M$ is exceeded prior to the arrival of the synchronized time-base pulse. The L potential appearing in this case for the duration between two measuring pulses at the output of the presetting member $SE_M$ produces via the AND gate $G_S$ the changeover of the trigger $FF_2$ by the clock pulse; the output $C_2$ is marked. At the arrival of the time-base pulse the trigger $FF_1$ is changed over by the clock pulse which coincides with the time-base pulse and hence also the AND gate $G_A$, so that the changeover of the trigger $FF_3$ with the clock-pulse frequency is initiated and the AND gate $G_{R1}$ is switched on. The pulses of the follower frequency $f_{p/2}$ passed by the output of the trigger $FF_3$ pass through the AND gate $G_{R2}$ and the anticoincidence stage A and reach the subtracting input $E_R$ of the counter Z, which counts backwards by the difference frequency formed by half the clock-pulse frequency $f_{p/2}$ and the measuring frequency $f_i$, since $f_{p/2} > f_i$. When the desired value is reached again, the L potential appears at the output of the presetting member $SE_M$. As a result the changeover of the trigger $FF_1$ and of the trigger $FF_2$ back to the rest position shown is prepared directly and via the AND gate $G_A$ respectively and via the gates $G_A$ and $G_0$ or $G_E$ the resetting of the counter Z to zero or to the final value is initiated. After the changeover of the trigger $FF_1$ also the trigger $FF_3$ is set back to its rest position by the clock pulse. Until the arrival of the next time-base pulse over a distance $T_1$ from the preceding pulse the counter again counts with the measuring frequency and so on. Then, since $f_i$ exceeds $f_s$, output signals proportional to the control departure are available at the outputs of the AND gates $G_{R1}$ and $G_{R2}$. The position of the comparison counter then exhibits in the stationary state the basic time variation shown in FIG. 3b with a constant departure between $f_i$ and $f_s$.

If the desired value is equal to the actual value, the counter Z attains the counter position of the desired value stored in the presetting member $SE_M$ simultaneously with the arrival of the time-base pulse. The bistable triggers $FF_1$ and $FF_2$ are changed out of their rest positions by the same clock pulse. The next following clock-pulse changes over the triggers $FF_1$ and $FF_2$ back to their rest positions and the counter, which is preset via the gates $G_A$ and $G_0$ or $G_E$, is adjusted to zero or to the final value. Via the AND gate $G_K$ and the inverter stage $N_K$ the gate $G_{R1}$ is prevented from conducting as long as the output $C_2$ of the trigger $FF_2$ is marked, so that no additional pulse can reach the counter Z. The outputs $A_{V1}$, $A_{V2}$, and $A_{R1}$, $A_{R2}$ are at zero potential.

If the desired scanning time amounts to one-tenth of the value determined by the quotient of the desired value and the measuring frequency at a point of zero control departure, the desired value stored in the presetting member $SE_M$ of the control device of FIG. 3 amounts to $10h+z$ with $e=10$ time-base intervals by raising the adjustment of the counter $Z_M$ to its final value apparently up to $10h+z+1$. The intervals $m$ of the 10 intervals in which this has to take place are determined by:

$$m = \frac{n \cdot 10}{e}$$

wherein $n=1...e$ and $e$ is the desired value stored in the presetting member $SE_T$ (FIG. 1). The calculated values of $m$ have to be rounded off to integral numbers, since $m$ may only be an integral number. For the values $e=0$ to $e=9$ therefore the table of FIG. 4 is obtained.

Figure 5:
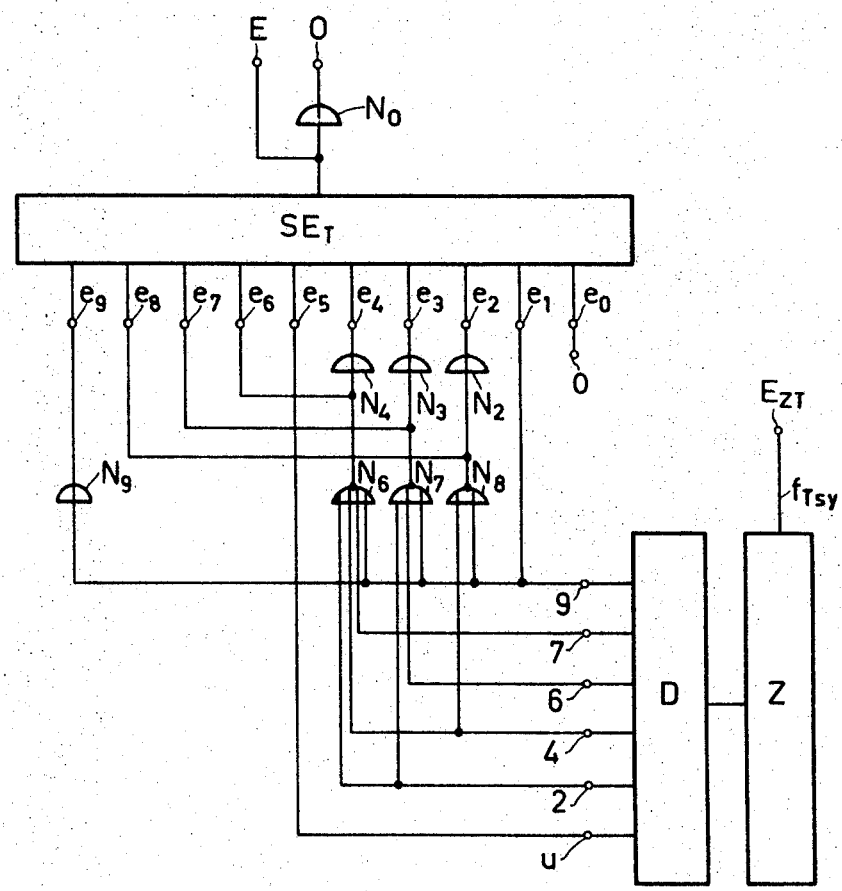
FIG. 5 illustrates the logical diagram of an embodiment of the frequency divider comprising a presetting member.
Figures 6, 7:
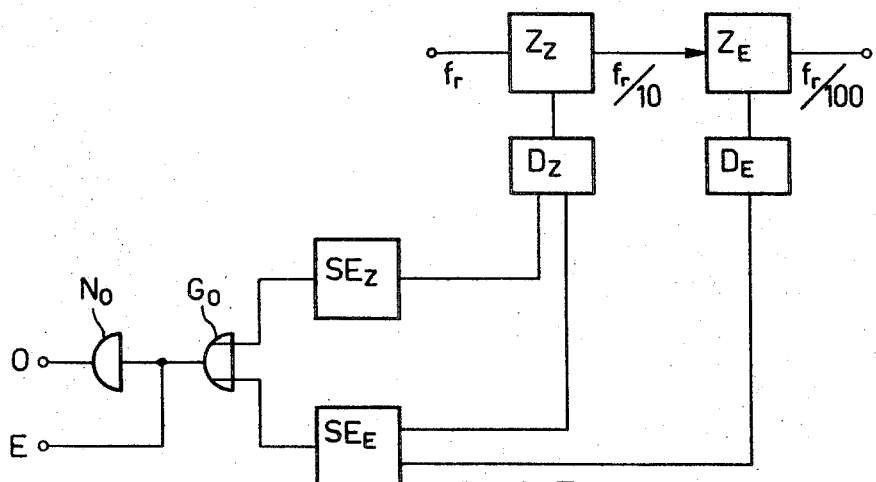
FIG. 6 illustrates the pulse selection in this embodiment.
FIG. 7 shows the extension of the frequency divider to two decades.

FIG. 5 shows one embodiment of the frequency divider $Z_T$ with the presetting member $SE_T$ for the supply of the control signals corresponding to this presetting for the control device of FIG. 3, comprising a counter Z having a capacity 10, a decoding member D, selection stages $N_q$, $N_2$, $N_3$, $N_4$, $N_6$, $N_7$, $N_8$, the inverter state $N_O$ and the presetting member $SE_T$ for the adjustment or the storage of the desired value $e$. The time intervals $m$ correspond to the counter positions 0 to 9. The selection of the positions of the counter Z with a predetermined desired value $e$, in which the desired value stored in the presetting member $SE_M$ (FIG. 3) is apparently raised by 1, is made by the table of FIG. 6, where it can be retraced more easily than in the table of FIG. 4. The table of FIG. 6 is obtained from that of FIG. 4 by assuming other phase positions of the time-base pulses at the beginning of, each time, the first time-base interval with respect to the first pulse of the measuring frequency.

The counter Z receives continuously the pulses of a time-base generator (not shown) synchronized in a synchronizing state (not shown) with a clock-pulse frequency. In the decoding member D it is assessed, apart from the counter positions 2, 4, 6, 7 and 9, whether the counter position corresponds to an odd numbered digit. The coupling of the outputs of the decoding member indicated via the NOR gates $N_2$, $N_3$, $N_4$, $N_6$, $N_7$, $N_8$ and $N_9$ provides at the terminals $e_0$ to $e_9$ pulse sequences in accordance with the selection indicated in FIG. 6 from 10 time-base pulses each. The presetting member $SE_T$ serves for selecting the pulses sequence corresponding to the stored or adjusted desired value $e$. The output E of the presetting switch is at L potential at a desired value $e=4$, for example, in the time-base intervals 3, 5, 8 and 10 and in the further time intervals L potential appears at the output 0 of the inverter stage $N_0$. Then the signals required for the control of the adjustment to zero or to the final value of the counter $Z_M$ (FIG. 3) are available.

If the desired scanning time is one-hundredth of the value determined by the quotient of the desired value and the measuring frequency with a control departure 0, the desired value $h$ adjusted in the presetting member $SE_M$ of the control device of FIG. 3 with $10z+e$ of 100 time-base intervals has to be raised apparently to $h+1$. The time intervals $m$ of the 100 intervals in which this has to be carried out are determined by:

$$m = \frac{n \cdot 100}{10z + e}$$

wherein $n=1, 2,... 10z+e$, whilst the calculated values of $m$ are again rounded off to integral numbers. A frequency divider capable of providing control signals accurately corresponding to this requirement can be obtained only by complicated logical coupling elements.

FIG. 7 shows an embodiment of the frequency divide $Z_T$ with presetting members extended to two decades, the construction of which is simple; the phase errors of the output pulse sequences with respect to the correct pulse sequences are slight. This arrangement comprises the counting decades $Z_Z$ and $Z_E$, the decoding members $D_Z$ and $D_E$, the presetting members $SE_Z$ and $SE_E$, the OR gates $G_0$ and the inverter stage $N_0$. The two counting decades $Z_Z$ and $Z_E$, the decoding members $D_Z$ and $D_E$ and the presetting member $SE_Z$ are of the same construction as those of the FIG. 5. The presetting member $SE_E$ has to be controlled not only by the decoding member $D_E$ but also by the decoding member $D_Z$ in order to ensure that the output signals of the presetting members $SE_Z$ and $SE_E$ do not appear simultaneously. With a desired value of $100h+10z+e$ the digit $z$ of the desired value is stored in the presetting member $SE_Z$ and the digit $e$ is stored in the member $SE_E$ and the pulse sequences corresponding to the digits are formed. During $10z+e$ of 100 times intervals there appears at the output of the OR gate $G_0$ the L potential required for the apparent increase of the desired value in the comparison counter (FIG. 3) to $h+1$.

I claim:

1. A control device for providing an indication of the quantitative difference between a fixed and measured value, comprising a comparison counter for accumulating a count corresponding to said measured value, a plurality of presetting means, each containing a fractional proportion of said fixed value, a first of said presetting means coupled to said comparison counter for providing an indication of equality between the fractional proportion of said fixed value stored in said first of said presetting means and said corresponding proportion of said measured value reached by said comparison counter, a second of said presetting means coupled to a frequency divider and said comparison counter for providing an indication of equality between a further fractional proportion of said fixed value stored in said second of said presetting means and said corresponding proportion of said measured value reached by said comparison counter, means for providing common timing signals to said frequency divider and said comparison counter, and further means coupled to said comparison counter for providing time and polarity signals indicative of the deviation between said fixed and measured values at the moment of a timing signal.

2. A device as claimed in claim 1 wherein said means for providing time and polarity signals corresponding to the control deviation includes said presetting member controlled by the output of the comparison counter for the coarse adjustment of the desired value, and further comprising a first bistable trigger having first and second inputs connected respectively to said output of said counter and by the pulses of a time base, first and second gates connected by their respective inputs to the first and second outputs of said first bistable trigger and in common to the output of said presetting member, the output of said first and second gates respectively coupled to the first and second inputs of a second bistable trigger, a third bistable trigger controlled by said second output of said first trigger and supplying half the clock-pulse frequency along an output thereof, a third AND gate coupled to the output of the third bistable trigger and said first AND gate, the output of said third AND gate coupled through an inverter stage, fourth and fifth AND gates connected by their respective inputs to first and second outputs of said second bistable trigger, to the output of the inverter stage and to said second output of said first trigger, the outputs of said fourth and fifth gates providing time intervals proportional to the control deviation and coupled to the respective inputs of sixth and seventh AND gates with the output of said third trigger, the outputs of said sixth and seventh gates providing pulse numbers proportional to the control departure, a source of measured pulses, a summation stage coupled to the output of said seventh gate and said first gate and to said source of measured pulses, an anticoincidence stage connected between said comparison counter, said summation stage and the output of said sixth AND gate, and further AND gate means having one input coupled to the output of said first AND gate and a further input coupled to the output of said second presetting means, said further AND gate means having an output coupled to said comparison counter for resetting said counter in accordance with signals appearing at the output of said further AND gate means.

3. A device as claimed in claim 2 comprising a plurality of control devices, said frequency divider common to all control devices and comprising a counter controlled at the input by the pulses of a time base, an associated decoding member and a logical selection circuit, the outputs thereof being present at predetermined instants.

4. A time proportional control device for producing a time proportional control signal indicating deviation between a measured and prescribed signal, comprising a source of time base signals, a counter, means applying a measured signal to said counter, a source of counting signals, first gating means responsive to a time base signal for combining said measured signal with said counting signals, said counter thereby changing rates and counting thereafter at said combined signals rate, a coarse selection circuit coupled to said counter and having preset therein the value of a fractional proportion of said prescribed signal, said selection circuit responsive to said counter for raising said value by one, a fine selection circuit coupled by a fine selection gating means to said counter and having preset therein a further fractional proportion of said prescribed signal, said coarse selection circuit responsive to an equality of a corresponding count portion in said counter with respect to said fractional proportion of said prescribed count preset in said coarse selection circuit to produce an output signal, second gating means responsive to said output signal for blocking said first gating means and providing a counter reset signal to said fine selection gating means, said fine selecting gating means responsive to an equality of count between said counter and said further fractional proportion of said prescribed signal preset in said fine selection circuit to provide an output signal from said fine selection gating means to reset said counter, the duration between time base and reset being said time proportional control signal.

PO-1050 (5/69)

UNITED STATES PATENT OFFICE
CERTIFICATE OF CORRECTION

Patent No. 3,576,532           Dated April 27, 1972

Inventor(s) GERHARD KAPS

It is certified that error appears in the above-identified patent and that said Letters Patent are hereby corrected as shown below:

Col. 1, line 21, before "higher" insert --a--;

Col. 1, line 57, after "Means" insert --are provided--;

Col. 2, line 53, before "876" insert --=--;

Col. 2, line 55, before "876" insert --=--;

Col. 2, line 71, cancel "whilst" and insert --while--;

Col. 3, line 20, before "76" insert --=--;

Col. 3, line 49, "$FF_1$" should be --$FF_2$--;

Col. 5, line 24, "$N_q$" should be --$N_9$--;

Col. 5, line 71, "divide" should be --divider--;

IN THE CLAIMS

Claim 3, line 3, after "devices" insert --and coupled thereto through the input of said second presetting m Signed and sealed this 5th day of September 1972.

(SEAL)
Attest:

EDWARD M. FLETCHER JR.          ROBERT GOTTSCHALK
Attesting Officer               Commissioner of Patents